(12) United States Patent
Djurdjevic et al.

(10) Patent No.: US 9,727,602 B2
(45) Date of Patent: Aug. 8, 2017

(54) DATABASE UPDATING WITH LATENCY TOLERANCE

(71) Applicant: TSX INC., Toronto (CA)

(72) Inventors: Deana Djurdjevic, Toronto (CA); Kevin Sampson, Toronto (CA); Derek Hwong, Toronto (CA)

(73) Assignee: TSX INC., Toronto (CA)

( * ) Notice: Subject to any disclaimer, the term of this patent is extended or adjusted under 35 U.S.C. 154(b) by 0 days.

(21) Appl. No.: 15/247,265

(22) Filed: Aug. 25, 2016

(65) Prior Publication Data
US 2016/0364437 A1    Dec. 15, 2016

Related U.S. Application Data

(63) Continuation of application No. PCT/CA2015/000411, filed on Jun. 23, 2015.
(Continued)

(51) Int. Cl.
*G06F 17/30* (2006.01)
*G06Q 50/10* (2012.01)
*G06Q 40/04* (2012.01)

(52) U.S. Cl.
CPC .. *G06F 17/30371* (2013.01); *G06F 17/30306* (2013.01); *G06F 17/30365* (2013.01); *G06Q 40/04* (2013.01); *G06Q 50/10* (2013.01)

(58) Field of Classification Search
CPC ......... G06F 17/30371; G06F 17/30365; G06F 17/30306; G06Q 10/06375; G06Q 10/087; G06Q 50/10; G06Q 40/04
(Continued)

(56) References Cited

U.S. PATENT DOCUMENTS 5,408,656 A * 4/1995 Cohn ............... G11B 20/10
5,828,843 A * 10/1998 Grimm ............ G06F 9/5027
463/42
(Continued)

FOREIGN PATENT DOCUMENTS

CA    2707196 A1    1/2011
WO    2007002843 A2    1/2007

OTHER PUBLICATIONS

Yan et al., Algorithms For Low-Latency Remote File Synchronization, INFCOM 2008, The 27th Conference on Computer Communications. IEEE, Year:2008, pp. 9.*
(Continued)

*Primary Examiner* — Greta Robinson
(74) *Attorney, Agent, or Firm* — Perry + Currier Inc.

(57) ABSTRACT

New data messages for updating a database can indicate a latency tolerance. The latency tolerance can constrain new data records based on such new data messages to also indicate the latency tolerance. Latency-tolerant data records can be constrained to remain in the working database for a minimum duration. Data records present in the working database can be prioritized according to prioritization criteria that increases priority of data records indicating latency tolerance. Matching incoming data messages with the data records present in the working database can be based on such prioritization. A matched data record can be updated or deleted upon successful match with an incoming data message. The latency tolerance can be applied to trading systems for financial instruments or interests as a long-life order that rests in an order book without being able to be cancelled or updated for the minimum duration in exchange for priority during order matching.

30 Claims, 6 Drawing Sheets

Related U.S. Application Data

(60) Provisional application No. 62/065,983, filed on Oct. 20, 2014.

(58) Field of Classification Search
USPC ....... 707/609, 625, 662, 663, 664, 666, 668, 707/687, 689, 692, 694, 758, 821, 825, 707/950; 705/1.1, 26.3, 26.4, 33, 34, 35, 705/37; 709/204, 207
See application file for complete search history.

(56) References Cited

U.S. PATENT DOCUMENTS

| | | | | |
|---|---|---|---|---|
| 5,842,216 | A * | 11/1998 | Anderson | H04L 1/1678 |
| 5,949,799 | A * | 9/1999 | Grivna | H04L 1/1664 370/258 |
| 6,006,254 | A * | 12/1999 | Waters | H04L 12/1868 709/204 |
| 6,374,241 | B1 * | 4/2002 | Lamburt | G06F 17/30873 |
| 7,587,449 | B2 * | 9/2009 | Shah | H04L 43/0864 709/203 |
| 7,716,180 | B2 * | 5/2010 | Vermeulen | G06F 17/30212 707/626 |
| 8,090,641 | B1 | 1/2012 | Monroe | |
| 8,494,951 | B2 | 7/2013 | Claus et al. | |
| 8,832,211 | B1 * | 9/2014 | Lebedev | G06Q 40/04 705/35 |
| 2005/0137961 | A1 | 6/2005 | Brann et al. | |
| 2008/0172321 | A1 | 7/2008 | Bartko et al. | |
| 2010/0088216 | A1 | 4/2010 | Czupek et al. | |
| 2010/0332367 | A1 | 12/2010 | Foygel et al. | |
| 2011/0161334 | A1 * | 6/2011 | Sivakkolundhu | G06F 17/30241 707/758 |
| 2012/0317011 | A1 * | 12/2012 | Duquette | G06Q 40/04 705/37 |
| 2013/0297478 | A1 | 11/2013 | Mannix | |
| 2015/0066727 | A1 | 3/2015 | Wepsic et al. | |
| 2015/0073967 | A1 | 3/2015 | Katsuyama et al. | |

OTHER PUBLICATIONS

Saglam et al., System-On-A-Chip Processor Synchronization Support in Hardware, Design, Automation and Test in Europe, 2001. Conference and Exhibition 2001 Proceedings, Year: 2001, pp. 633-639.*

International Search Report issued by the Canadian Intellectual Property Office dated Oct. 16, 2015 for corresponding International Patent Application No. PCT/CA2015/000411 filed Jun. 23, 2015.

Written Opinion of the International Authority issued by the Canadian Intellectual Property Office dated Oct. 16, 2015 for corresponding International Patent Application No. PCT/CA2015/000411 filed Jun. 23, 2015.

Joe Saluzzi, "Is it Time To Require Minimum Life On Orders?", http://tabbforum.com/opinions/is-it-time-to-require-minimum-life-on-orders, Nov. 2, 2011.

J. Doyne Farmer, "Minimum resting times and transaction-to-order ratios: review of Amendment 2.3.f and Question 20", Foresight, Government Office For Science, 2012.

* cited by examiner

OFFER ORDERS 110

| PRICE 112 | LATENCY TOL. 114 | TIME 116 | ... | VOL. 118 |
|---|---|---|---|---|
| 10.01 | Y | 10:12:34 | | 100 |
| 10.01 | Y | 10:12:37 | | 1000 |
| 10.01 | Y | 10:12:39 | ... | 100 |
| 10.01 | N | 10:12:32 | | 200 |
| 10.01 | N | 10:12:33 | | 100 |
| 10.01 | N | 10:12:35 | | 500 |
| 10.02 | Y | 10:12:31 | ... | 100 |

FIG. 5a

OFFER ORDERS 110

| PRICE 112 | BROKER ID 120 | LATENCY TOL. 114 | TIME 116 |
|---|---|---|---|
| 10.01 | 99 | Y | 10:12:34 |
| 10.01 | 99 | Y | 10:12:37 |
| 10.01 | 99 | N | 10:12:35 |
| 10.01 | 64 | Y | 10:12:33 |
| 10.01 | 64 | N | 10:12:33 |
| 10.01 | 23 | Y | 10:12:35 |
| 10.01 | 55 | N | 10:12:31 |

FIG. 5b

DATABASE UPDATING WITH LATENCY TOLERANCE

CROSS-REFERENCE TO RELATED APPLICATIONS

This application claims priority to U.S. application Ser. No. 62/065,983, filed Oct. 20, 2014, and incorporated herein by reference.

FIELD

This disclosure relates to electronic data systems.

BACKGROUND

Fast and efficient data processing and database updating are common concerns. It is often the case that data messages targeted for a database are sent unnecessarily. This can occur when incoming data update messages arrive after data targeted for update has been updated differently or has been deleted from the database. This may necessitate further data update messages to cancel or correct the now-stale data update messages. It may be the case that network traffic is needlessly consumed and processing efficiency is reduced in dealing with a plethora of data messages that have little or no net desirable effect. In the financial industry, some or all of these effects may lead to a lack of sufficient liquidity in an order book and uncertainty in order fulfillment for certain types of market participants, among other problems.

SUMMARY

According to one aspect of the present invention, a method for updating a database includes receiving a plurality of new data messages, the new data messages containing data for modifying data within a working database. At least one data message of the new data messages is configured to indicate a latency tolerance. The method further includes adding new data records to the working database based on some of the new data messages, including adding at least one new data record for the at least one data message indicating the latency tolerance. The latency tolerance is configured to constrain new data records indicating the latency tolerance to remain in the working database for a minimum duration. The method further includes prioritizing the data records present in the working database according to prioritization criteria, the prioritization criteria configured to increase priority of data records indicating the latency tolerance. The method further includes matching data messages of the plurality of new data messages with the data records present in the working database according to the prioritizing of the data records, a particular data record being updated or deleted upon successful match with a particular new data message.

Updating or deleting a data record based on a successful match can be performed irrespective of the latency tolerance.

Updating a data record can be configured to not remove the latency tolerance.

Updating a data record can be configured to not modify any elapsed time under the minimum duration for the data record.

Updating a data record can reset elapsed time under the minimum duration for the data record.

The latency tolerance can specify an amount for the minimum duration.

The minimum duration can be between about 1 millisecond and about 30,000 milliseconds.

The plurality of new data messages can represent a plurality of orders for a financial instrument or interest whose bid and offer orders can be represented by the data records in the working database.

The at least one data message can be configured with an attribute to indicate the latency tolerance.

The prioritization criteria can be configured to prioritize data records based on price and thereafter based on affirmative latency tolerance and thereafter based on time.

The method can further include delaying an update to or a deletion of at least one of the new data records indicating the latency tolerance by a calculated duration.

The method can further include randomly or pseudo-randomly calculating the duration.

The randomly or pseudo-randomly calculated duration can be bounded by maximum and minimum bounds.

According to another aspect of the present invention, a database system includes a communications interface configured to receive data messages over a network, a working database for storing data records based on data contained in data messages, and an engine configured to add new data records to the working database based on new data messages, including adding at least one new data record for at least one data message indicating a latency tolerance. The latency tolerance is configured to constrain new data records indicating the latency tolerance to remain in the working database for a minimum duration. The engine is further configured to prioritize the data records present in the working database according to prioritization criteria, the prioritization criteria configured to increase priority of data records indicating the latency tolerance. The engine is further configured to match received data messages with the data records present in the working database according to the prioritizing of the data records, a particular data record being updated or deleted upon successful match with a particular new data message.

The engine can be configured to update or delete a data record based on a successful match irrespective of the latency tolerance.

The engine can be configured to not remove the latency tolerance when updating a data record.

The engine can be configured to not modify any elapsed time under the minimum duration for an updated data record.

The engine can be configured to reset an elapsed time under the minimum duration for an updated data record.

The latency tolerance can specify an amount for the minimum duration.

The minimum duration can be between about 1 millisecond and about 30,000 milliseconds.

The data messages can represent orders for a financial instrument or interest whose bid and offer orders can be represented by the data records in the working database.

The at least one data message can be configured with an attribute to indicate the latency tolerance.

The prioritization criteria can be configured to prioritize data records based on price and thereafter based on affirmative latency tolerance and thereafter based on time.

The engine can be configured to delay an update to or a deletion of at least one of the new data records indicating the latency tolerance by a calculated duration.

The engine can be configured to randomly or pseudo-randomly calculate the duration.

The randomly or pseudo-randomly calculated duration can be bounded by maximum and minimum bounds.

BRIEF DESCRIPTION OF THE DRAWINGS

The drawings illustrate, by way of example only, embodiments of the present disclosure.

FIGS. 5a-5b are tables of data according to examples.

DETAILED DESCRIPTION

The present disclosure discusses latency-tolerant data records for a database. Data records indicating latency tolerance can be constrained to remain in the database for a minimum duration. Data records present in the working database can be prioritized according to prioritization criteria that increases priority of data records indicating latency tolerance. Matching of incoming data messages with the data records present in the working database can be based on such prioritization. Latency tolerance can be applied to trading systems for financial instruments or interests, for example, as a long-life order that rests in an order book without being able to be cancelled or updated for the minimum duration in exchange for priority during order matching.

Figure 1:
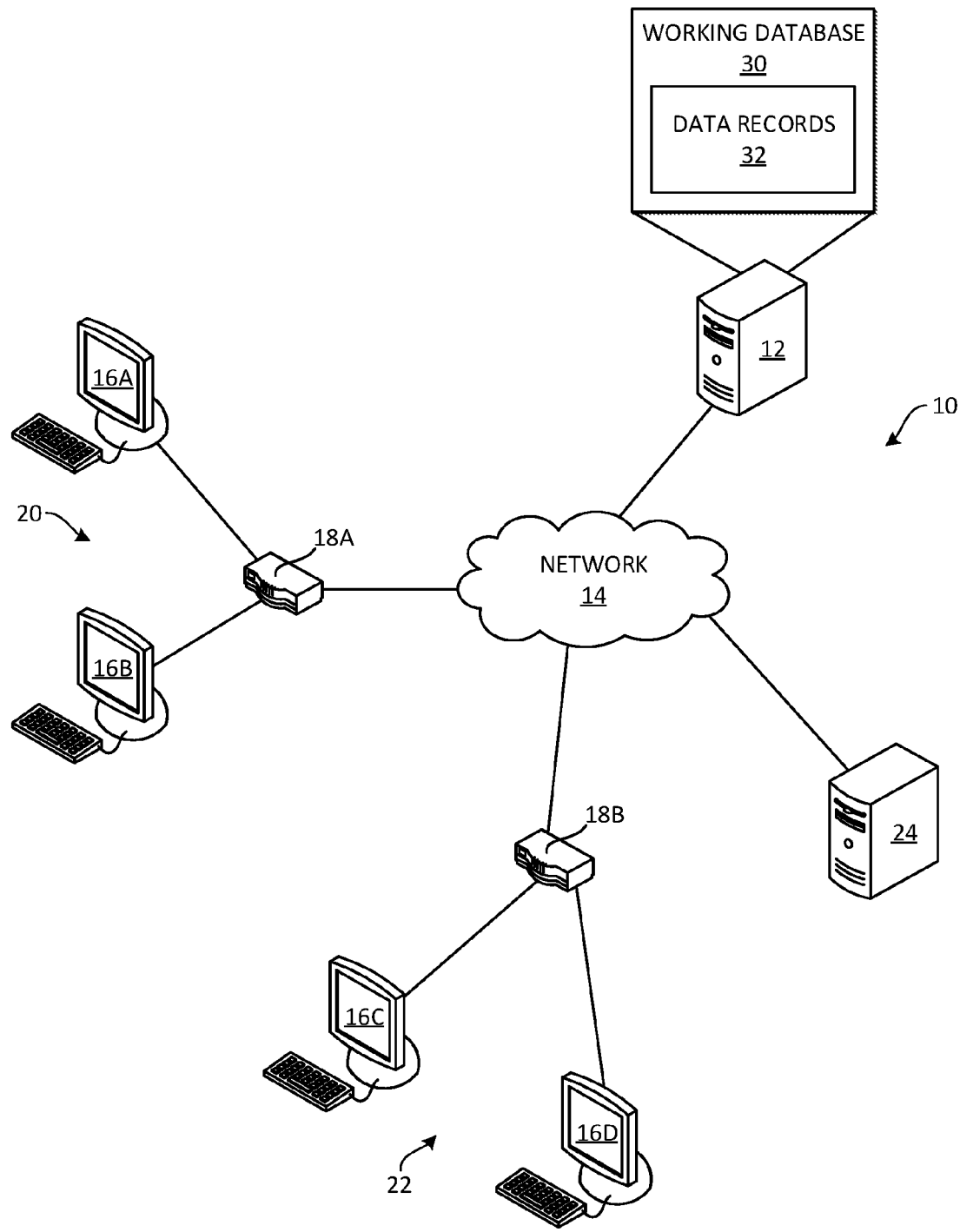
FIG. 1 is a block diagram of a computer system.

FIG. 1 shows a computer system 10 configured for maintaining a working database.

The system 10 includes at least one database system 12 connected to one or more computer networks 14. The database system 12 can be located in the domain of a computerized exchange, trading system, or other entity.

The system 10 further includes data sources 16A, 16B, 16C, 16D (referred to generally herein as data source 16 and collectively as data sources 16) connected to the network 14 via network devices 18A, 18B, such as access points, routers, servers, and similar. The data sources 16 belong to various domains 20, 22 controlled by different entities or organizations. The data sources 16 execute client programs that allow input of data for data messages, transmission of data messages to the database system 12, and reception and output of results of such data messages. The data sources 16 can be controlled by market participants, where the data messages communicate orders for financial instruments or interests.

The system 10 may further include other servers 24 connected to the network 14. The other servers 24 may provide various other functions, such as publishing data received from the database system 12, aggregating data, and similar. The other servers 24 may operate in various domains.

The network 14 can include any number and type of computer networks, such as a local area network (LAN), wide-area network (WAN), virtual private network (VPN), intranet, and the Internet. The network 14 operates to communicatively couple the database system 12, the various data sources 16, and the other servers 24, while isolating domains from one another and restricting communications between domains.

The database system 12 includes a working database 30 that stores data records 32 that originate from data received in the data messages. The working database 30 is configured to prioritize data records 32 based on latency tolerance associated with such data records and specified in particular data messages that resulted in the creation of such data records.

The indication of latency tolerance, in data messages and in data records, can include a Boolean value (e.g., Yes/No, 1/0, TRUE/FALSE), where one value represents affirmative latency tolerance and the other value represents no latency tolerance. Alternatively, the latency tolerance specifies a minimum duration, and accordingly may be expressed as a numerical time (e.g., 1000 milliseconds, 1.5 seconds, etc.), a qualitative amount (e.g., "low", "high", etc.), or similar.

The data sources 16 are each configured by a client program to allow input of data to generate data messages destined for the working database 30. The database system 12 is configured to compare and, if possible, match an incoming data message to one or more complementary data records, if present in the working database 30, and to store the incoming data message, or unmatched part thereof, in the working database 30.

The latency tolerance constrains new data records to remain in the working database 30 for minimum duration. That is, when a new data message contains an indication of latency tolerance, a resulting data record created in the working database 30 is constrained by the latency tolerance to remain in the working database 30 for the minimum duration. The resulting data record cannot be updated or deleted unless matched with a complementary data message. Further, latency-tolerant data records can be given a priority higher than non-latency restricted data records when matching data records with incoming data messages. The latency tolerance can be one of several prioritization criteria. This can advantageously increase the likelihood that a subsequently received complementary data message can be matched with the latency-tolerant data record. In an example pertaining to trading of financial instruments or interests, the latency tolerance constrains an order to rest in the order book for a minimum duration, but gives such order a higher priority when matching with active orders. This can advantageously increase liquidity in the order book and reward market participants willing to provide such liquidity for the minimum duration.

In other examples, updating a data record with respect to parameters that do not reduce or cancel an order are permitted before expiry of the minimum duration.

The degree of restricting updating and/or deletion of data records based on the latency tolerance is independent of the degree of prioritization given to latency-tolerant data records. That is, update/deletion prevention may be performed to some degree based on affirmative latency tolerance, and prioritization may be performed to another degree based on the latency tolerance. In a financial example, latency-tolerant orders are given a high degree of priority over other orders, and are subject to more or longer update/deletion restrictions. In another financial example, latency-tolerant orders are given a low degree of priority over other orders, and are subject to fewer or shorter update/deletion restrictions. The relative degrees of restricting update/deletion and matching prioritization may be selected based on the requirements of specific implementations.

In implementations where more than one degree of latency tolerance is selectable, the degree of prioritization for matching can be linked to the degree of latency tolerance indicated. That is, latency tolerance indicated in an incoming data message is mapped to prioritization provided to a resulting data record that is created in the working database 30. For example, new orders may be configurable to specify one of several levels of latency tolerance (e.g., "high", "medium", "low", and "none"), where each level is mapped to a minimum duration (e.g., 5000 ms, 1000 ms, 100 ms, and 0 ms). Accordingly, orders rested in the database 30 may be prioritized in a ranking that directly reflects latency tolerance (e.g., orders with "high" latency tolerance at the same price level are ranked above orders with "medium" latency tolerance, which are ranked above orders with "low" latency tolerance, which are ranked above orders with no latency tolerance). Hence, an order that can tolerate a longer time in the order book is given matching priority over an order that can tolerate less time in the order book.

The minimum duration can be selected to be between about 1 millisecond (ms) and about 30,000 ms. Further, the minimum duration can be selected to be between about 100 ms and about 5000 ms. In further examples, the minimum duration can be selected to be between about 750 ms and about 1250 ms. Still further, the minimum duration can be selected to be about 1000 ms. The minimum duration can be static, dynamic, and/or configurable. That is, the minimum duration can be set once for a particular working database and not changed for a period of time. Alternatively, the minimum duration can be set to different values, automatically or manual, over a period of time. The minimum duration can be randomly determined, be it a static latency or a dynamic one. Additionally or alternatively, the minimum duration may be defined by an indication of latency tolerance in the order itself. This may be realized by a specific minimum duration that is identified by a numerical latency tolerance, a qualitative latency tolerance (e.g., "low") that maps to a specific minimum duration, or similar.

Figure 2:
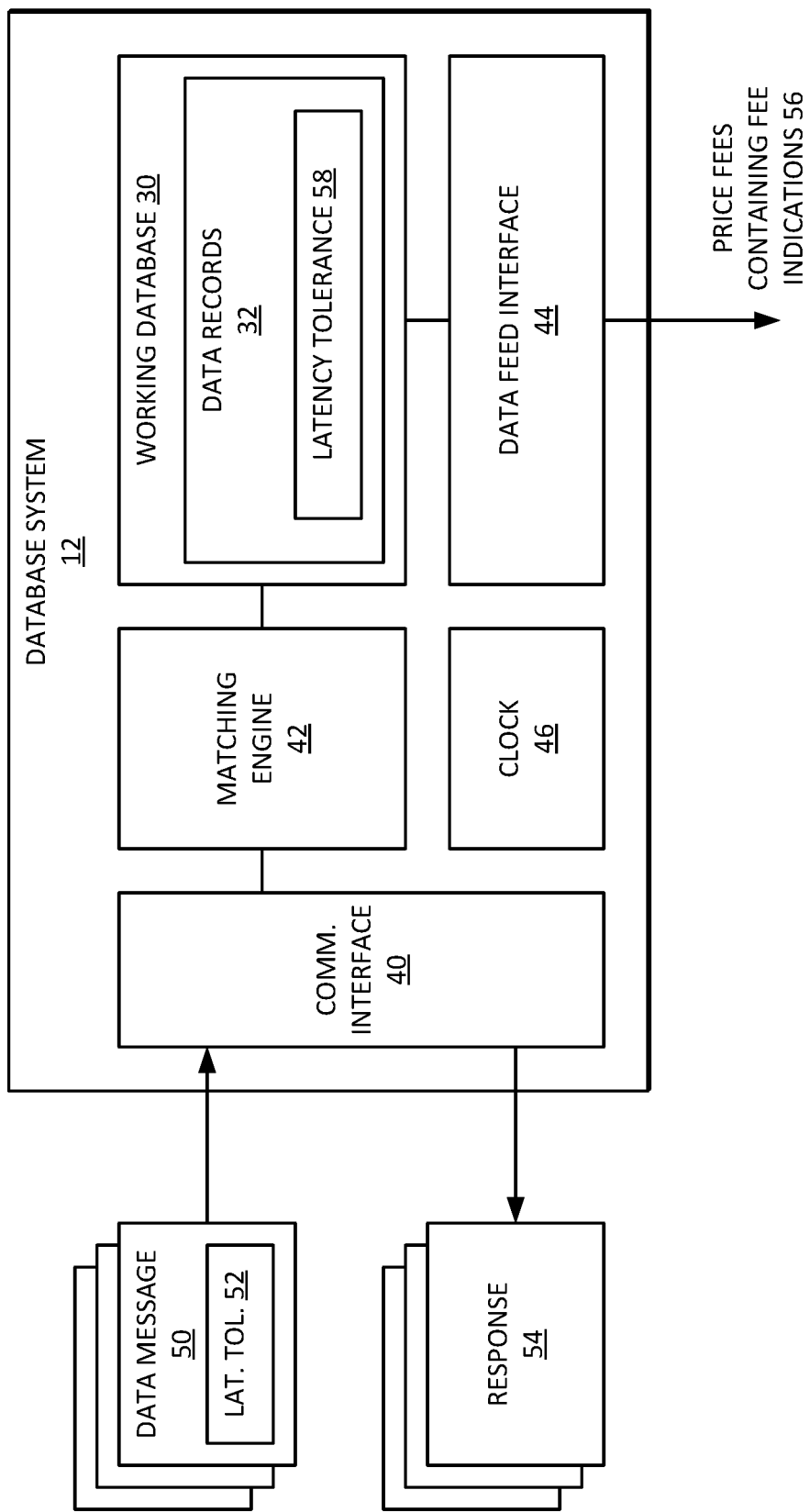
FIG. 2 is a block diagram of a database system.

FIG. 2 shows details of the database system 12. The database system 12 can include any suitable specifically configured computer, which can include one or more processors, one or more field-programmable gate arrays (FPGAs), memory (e.g., RAM, cache, etc.), mass storage devices, network adaptors, and user interface devices. These components are omitted from the figure for clarity. The components illustrated and discussed below may be implemented by special purpose programs stored in memory and executable by a processor or stored and executed by an FPGA.

The database system 12 includes a communications interface 40, a data message matching engine 42, the working database 30, a data feed interface 44, and a clock 46. The components 40, 42, 30, 44, 46 are illustrative and the distinct functionalities thereof may be combined into larger components or separated into smaller components based on specific implementation requirements. When more than one database system 12 is used, the components 40, 42, 30, 44, 46 may be distributed in the system 12 in various ways.

The communications interface 40 is configured to receive data messages 50, which may contain indications of latency tolerance 52, from various data sources 16 (FIG. 1) and to validate such data messages 50. Not all data messages 50 need indicate a latency tolerance. An example of a suitable schema for data messages and data records has attributes, wherein one of such attributes is configured to selectively indicate a latency tolerance. The indication of latency tolerance 52 is settable independently for each data message 50. In financial examples, the indication of latency tolerance 52 is a per-order attribute that is settable independently from other attributes, such as price, volume, etc. That is, latency tolerance is selectable on an order-by-order basis, as controlled by the market participant, thereby giving the market participant direct, flexible control of their orders.

The communications interface 40 can also be configured to timestamp data messages 50 upon receipt by, for instance, reading the clock 46 of the system 12 and writing a timestamp to an attribute of the data structure. Alternatively, the matching engine 42 or other component can be configured to timestamp data messages 50 upon receipt.

The communications interface 40 can further be configured to send responses 54 to the various data sources 16, where the responses are configured to indicate whether and how data messages 50 have been received and processed.

In this example, the communications interface 40 is integral to the system 12 and closely operatively coupled to the matching engine 42. Alternatively, the communications interface 40 can be provided in a data message gateway, such as a computer or program, where such gateway may be located separately from the matching engine 42.

The data message matching engine 42 is configured to process data messages 50 by matching incoming data messages 50 with data records present in the working database 30. The data message matching engine 42 is configured to store data, or a portion thereof, from a data message 50 in the working database 30, when the data is not able to match or if specified by the data message 50. The data message matching engine 42 is specifically configured to match data messages 50 with reference to latency tolerance 58.

The data feed interface 44 is configured to obtain data from the working database 30 and construct data feeds 56 from such data. Feeds may be provided to servers 24 (FIG. 1) and available to data sources 16 as well as other data consumers.

The clock 46 can be hardware clock and can be used to write timestamps for data records. Further, the clock 46 can be referenced when determining whether the minimum duration has expired for a particular data record that indicates latency tolerance.

Figures 3, 4:
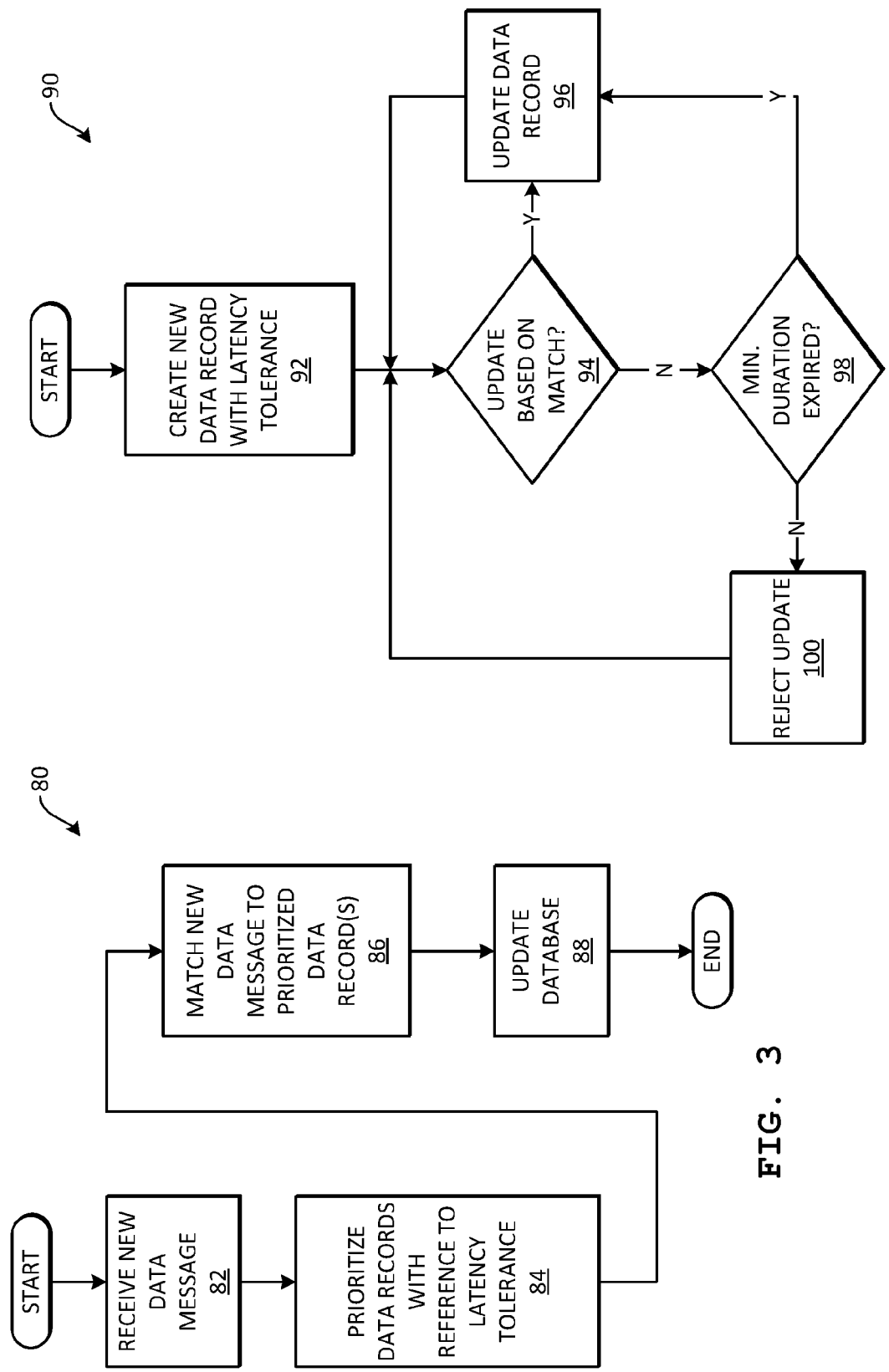
FIG. 3 is a flowchart of processing new data messages against data records having latency tolerance.
FIG. 4 is a flowchart of updating a data record having a latency tolerance.

FIG. 3 shows a method 80 for updating a database. The method 80 is described with reference to the system 12 for explanatory purposes, and this is not to be taken as limiting. The method 80 can be used with other systems. The method can be embodied by one or more programs that specifically configure the system 12.

At step 82, a new data message is received. The new data message contains data for modifying data within the working database 30. The data message may contain an indication of a latency tolerance.

Next, at step 84, data records to the working database 30 are prioritized according to prioritization criteria. Increased priority is given to data records indicating latency tolerance, such data records being based on previously received data messages indicating latency tolerance. As mentioned above, the latency tolerance is configured to constrain indicated data records to remain in the working database 30 available for matching for a minimum duration. In the example of trading financial instruments or interests, the prioritization criteria is configured to prioritize data records representative of resting orders based on price and thereafter based on the presence of the latency tolerance before prioritizing based on time. That is, the order book conforms to a price, latency tolerance, time priority scheme, where indication of latency tolerance ranks above lack of such indication. In similar examples, broker identification or other criteria may be included.

Prioritizing the data records in the working database 30 need not be a discrete event occurring after receiving a new data message. Prioritizing can be an ongoing process performed irrespective of receiving a new data message.

At step 86, the new data message is compared to the prioritized data records to determine whether one or more matches are possible. Comparing can include determining whether data in the prioritized data records meets conditions expressed by data in the new data message. In the example of trading financial instruments or interests, data representing bid and offer prices are compared. Additional data may also be compared, such as broker identification.

At step 88, the working database 30 is updated. Any particular data record that is matched to the new data message is updated or deleted upon successful match. The data content of the new data message is complementarily updated. If no match was made, the new data message may not be updated. Match or no match, a new data record may be created based on the new data message. When a new data record is created based on a new data message, any indication of latency tolerance in the new data message is added to the new data record. In the financial example, data representative of an unfilled portion of an order represented by the data message can be added to the working database as a new rested order represented by a new data record. If such order included a latency tolerance, then the rested order also includes the latency tolerance.

FIG. 4 shows a method 90 of updating a data record having a latency tolerance. The latency tolerance restricts the nature of updates to a data record, which helps in constraining the data record to remain in the working database in conjunction with the minimum duration.

At step 92 a new data record is created in the working database 30. This may be a result of an incoming data message whose data does not fully match with an existing data record. The incoming data message indicates latency tolerance, and thus the new data record is created with an indication of latency tolerance.

At some future time, at step 94, an update or deletion is to be performed on the latency-tolerant data record.

If the deletion or update is based on a match with a new incoming data message, then at step 96 the data record is updated irrespective of the latency tolerance. That is, in the financial example, the latency tolerance does not inhibit trading. Updating may include deleting the data record (e.g., full fill) or updating the data contained therein (e.g., partial fill). When the data record is not deleting, updating the data record does not remove the latency tolerance. That is, a partially filled order must still remain exposed to further incoming active orders until the minimum duration is met (equaled or exceeded).

Determining whether the minimum duration is met can be mathematically determined by subtracting the timestamp from the current time and comparing that to the minimum duration, as shown by the following expression:

$$\text{Current Time} - \text{Timestamp} \geq \text{Minimum}$$

If the timestamp less the current time is greater than or equal to the minimum duration, then the minimum duration has been met.

When updating is for another reason, such as the entity controlling the data record sending an update (e.g., data update, deletion/cancelation message, etc.) to the data record, then, at step 98, it is first determined whether or not the minimum duration has been met. That is, updates not based on matching are conditional on expiry of the latency. Whether or not the minimum duration has elapsed can be determined by comparing a timestamp stored in the data record with a current time tracked by the system 12. In other examples, certain data or attributes of a data record may be changed irrespective of expiry of the minimum duration. For instance, the account type attribute of an order may be permitted to be updated before expiry of the minimum duration. An order volume data value may alternatively or additionally be permitted to be increased before expiry of the minimum duration. Other examples of data or attributes that may be changed despite latency tolerance include other parameters that do not reduce or cancel the order.

If the minimum duration has been met, then the data record is updated at step 96. In the financial example, such updates may include cancelling/deleting the order or updating attributes (e.g., price, volume, etc.) of an order.

If the minimum duration has not yet been met, then update to the data record is rejected at step 100. Rejection of an update may also include indicating rejection in a response message 54 (FIG. 2) sent to the respective data source 16.

Updating the data record at step 96 does not modify any elapsed time under the minimum duration unless the update is a particular type of update, such as an update that results in the timestamp being updated. That is, any portion of the minimum duration that has already elapsed remains elapsed after an update. However, one or more particular types of update may be configured to result in the elapsed time being reset and the full duration of the minimum duration again being required to pass. Financial examples of such an update include changing an order's price, and such examples are contemplated to also update the order's timestamp. Alternatively or additionally, other conditions can be established to reset the elapsed time.

FIG. 5a shows prioritization of offer orders 110 in an order book in a financial example. The orders 100 are prioritized by prioritization criteria of price 112, affirmative latency tolerance (i.e., "Y") 114, and then time 116. Volume 118 and other order attributes (not shown) in the example shown are not part of the prioritization criteria. In other examples, broker identifier 120 (e.g., for broker preferencing), registered trader (RT) participation, market maker status, and other attributes can be used as prioritization criteria. FIG. 5b shows an example in which prioritization is at least based on price 112, broker 120, latency tolerance 114 for the same broker 120, time 116, and latency tolerance 114 for the same time 116, in that order. Bid orders follow the same principles.

Figure 6:
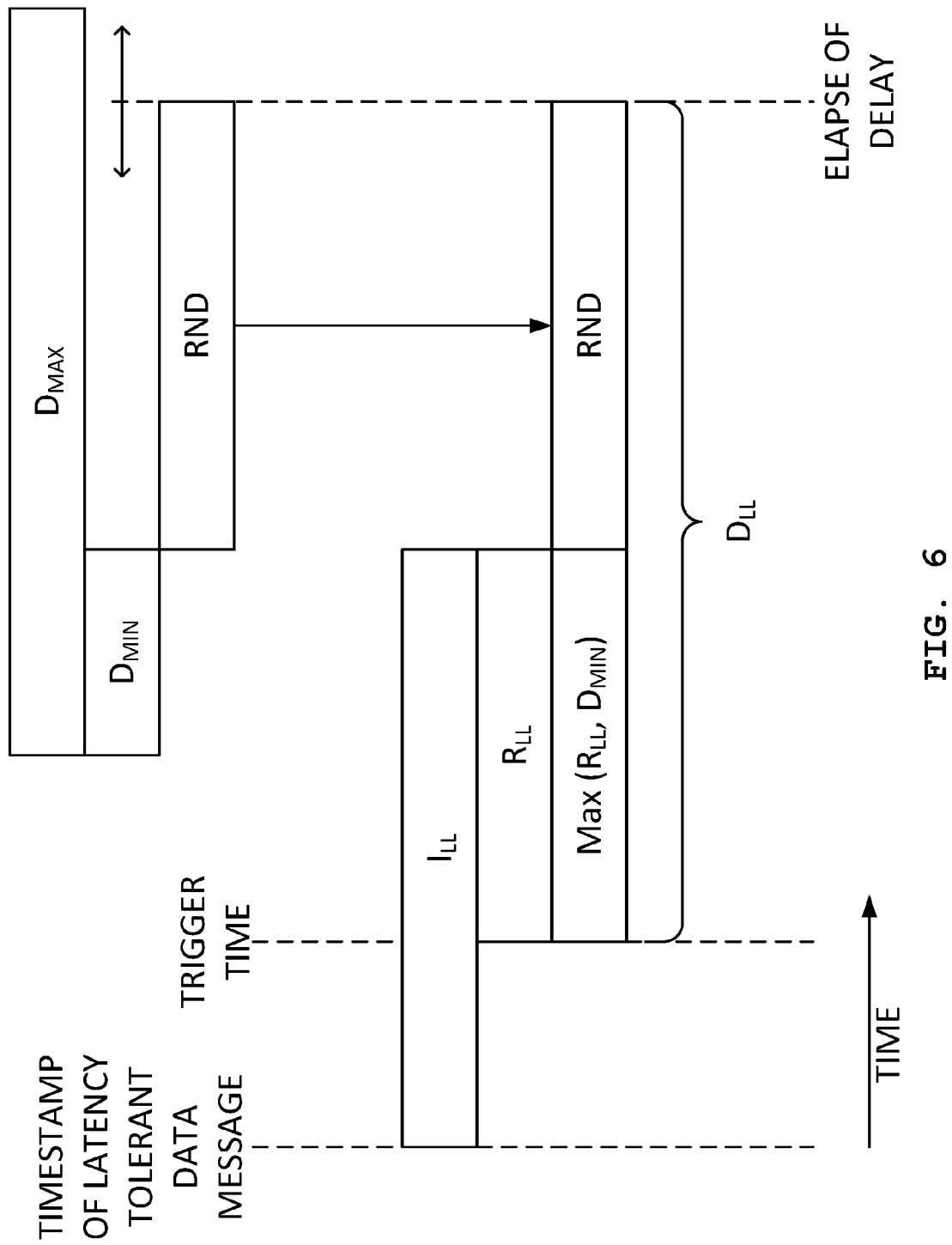
FIG. 6 is a diagram showing a delay duration calculation.

With reference to FIG. 6, in some implementations, the latency tolerance is configured to delay the cancellation or modification of new data records indicating latency tolerance. Latency tolerance imposes a minimum time interval $I_{LL}$ before updates to the new data record will be permitted. In financial examples, the minimum time interval $I_{LL}$ represents the minimum time interval that a long-life order must rest in an order book before the order can be cancelled or ceased (deleted) or otherwise subject to an update. Such deletions or updates may be realized by subsequent data messages (orders) that indicate the cancelling/deleting of an order represented by the new data record or the updating of such an order's attributes (e.g., price, volume, etc.).

Subsequent incoming data messages that have a predetermined effect on a latency-tolerant data record, such as deletion or update, are delayed for a random duration $D_{LL}$. The random duration $D_{LL}$ can be calculated based on a remaining interval $R_{LL}$ of the latency-tolerant data record and a random delay RND. The random duration $D_{LL}$ can be calculated using a random (or pseudo-random) number generator contained in the engine 42 or otherwise accessible to the engine 42.

Such subsequent data messages can be subject to a random delay RND that is bounded by a lower-bound minimum delay $D_{MIN}$ and an upper-bound maximum delay $D_{MAX}$. The random delay RND can be obtained by randomly or pseudo-randomly selecting a number according to a specific precision (e.g., nanosecond, microsecond) between 0 and the range between the upper and lower boundaries ($D_{MAX}$–$D_{MIN}$).

The random duration $D_{LL}$ is thus the actual random duration of delay for each data message pertaining to deletion or update to an existing latency-tolerant data record. The random duration $D_{LL}$ can be calculated using the formula:

$$D_{LL} = \text{Max}(R_{LL}, D_{MIN}) + \text{RND}$$

where Max( ) is a function that selects the maximum value of two or more inputted parameters.

FIG. 6 shows a schematic diagram of the calculation of the random duration $D_{LL}$ triggered by receipt of a data message that is to delete or update a latency-tolerant data record.

Figure 7:
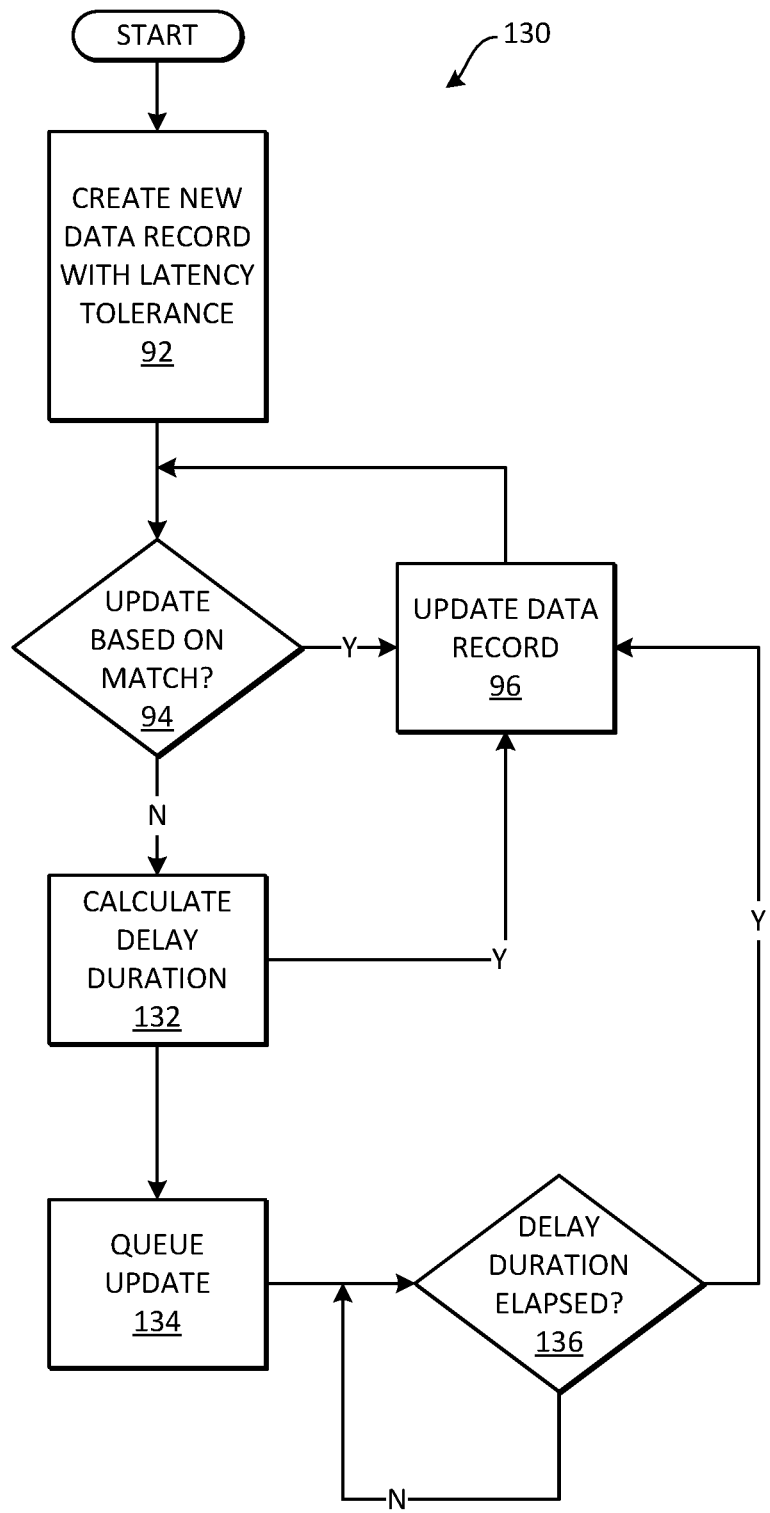
FIG. 7 is a flowchart of updating a data record having a latency tolerance.

FIG. 7 shows a method 130 of updating a data record having a latency tolerance. The latency tolerance restricts the nature of updates to a data record, which helps in constraining the data record to remain in the working database in conjunction with the minimum duration. The method 130 is similar to the method 90, which is discussed above and can be referenced for additional description. The method 130 includes delaying subsequent data messages that are to delete or update a latency-tolerant data record. The method 130 can be performed by the engine 42, discussed above, or by another component.

After a new latency-tolerant data record has been created in, for example, the working database 30 (step 92), and if a received deletion/update for such data record has been determined to not be based on a match with a new incoming data message (step 94), the delay duration for the received update is calculated at step 132. This can occur when, for example, a data message is received to cancel or otherwise update a latency-tolerant data record. The delay duration for the received update can be calculated as a random duration $D_{LL}$ per the above formula, in which the delay duration is selected as a limited random addition to the maximum of any remaining interval $R_{LL}$ of the latency-tolerant data record and a minimum delay $D_{MIN}$.

At step 134, the received update is placed in a queue and the calculated delay duration is checked for elapse at step 136. The queue can be any memory space configured to store incoming data messages subject to delay. The queue can be processed such that queued updates are released in order of ascending random duration $D_{LL}$.

Once the calculated delay duration has been met, then the data record is updated at step 96 to process the cancellation, deletion, or other update. In the financial example, such updates may include cancelling/deleting the order or updating order attributes (e.g., price, volume, etc.). Updates based on matching with a new incoming data message, are processes irrespective of the latency tolerance, via steps 94 and 96. That is, in the financial example, the latency tolerance does not inhibit trading. However, other kinds of updates and deletions are subjected to calculated delay durations.

The random or pseudo-random nature of the delaying of incoming data messages specifying updates and deletions may help prevent predictive algorithms from compensating for the delay.

A registered trader can be a market participant who is assigned to a symbol and who is responsible for maintaining exchange-specified market quality standards, such as minimum guaranteed fill sizes and quoted spreads. Registered traders may be provided the prioritization benefit of the techniques discussed herein, while not being subject to the update/deletion restriction or while being subject to more lenient update/deletion restriction than other traders. For a particular registered trader, priority benefit with reduced/relaxed restriction may be accorded for only the respective financial instrument or interest.

In the financial example, a data message and corresponding data record indicating latency tolerance may be known as a long-life order. The latency tolerance may be known as a long-life tag. For a particular order, cancellation and/or cancel former order (CFO) is only permitted after the minimum duration has elapsed. Further, use of the latency tolerance can be limited to a board-lot central limit order book (CLOB). Incoming active orders can be allocated to orders resting in the CLOB according to a price/broker/long-life/time allocation. Such allocation may specifically be defined as, from highest precedence to lowest precedence ranking criteria: price/broker preferencing with long-life/broker preferencing non-long life, RT participation, non-broker preferencing long-life, non-broker preferencing non-long-life.

In the financial example, advantages include incentivising passive liquidity for a duration of time by allocating priority to orders tolerant to latency. Providing priority to latency tolerant orders may appeal to natural investors who tend to be less latency sensitive and will be able to more effectively and confidently participate in the market without having to compete on speed. Increased fill rates for latency tolerant orders may also result. Entities making active orders may also benefit through higher fill rates due to greater reliability of displayed quotes, and by increasing the likelihood of interacting with the passive orders of natural investors. Further, latency tolerant orders may also reduce fleeting quote activity and message traffic by encouraging all providers of liquidity to use latency tolerant orders for strategies that are not dependent on the ability to quickly cancel an order.

General advantages include more efficient processing for databases, in that data records are temporally constrained so that operations (e.g., matching) can be performed before temporally constrained data records are released and permitted to be deleted or updated. This can lead to network traffic reductions due to fewer redundant or contradictory data messages or data messages specifying deletion of previously created data records being communicated. Further, processing efficiency may also be improved, as fewer data record matching operations may be possible, due to temporally containing one record so that it can be compared and/or matched several times with several other records within a duration of time.

In addition, it is advantageous that a source of data messages, such as a market participant, is able to specify latency tolerance, rather than the system inferring such. Latency tolerance can be specified differently for different data messages, and such per-message control can realize further advantages in efficiency and, in financial examples, improved passive liquidity and fill rates.

The techniques described above can be implemented in an electronic marketplace or trading system for issuing, trading, holding, transferring, buying, selling, or participating in other types of exchange for one or more financial instrument or interest. Electronic marketplaces and trading systems include one or more electronic networked order books, venues, trading venues, securities trading venues, marketplaces, exchanges, private equity exchanges, public securities exchanges, order books (e.g., dark books, lit books, etc.) within an exchange, alternative trading systems, and/or other markets, alone or in combination. Financial instruments and interests include exchange-traded funds (ETFs), securities, debt, shares, stocks, derivatives, and similar or other type of financial product, instrument, or interest. The techniques discussed herein can be applied to various computerized trading systems, including those operating in various marketplaces.

While the foregoing provides certain non-limiting example embodiments, it should be understood that combinations, subsets, and variations of the foregoing are contemplated. The monopoly sought is defined by the claims.

What is claimed is:

1. A method for updating a database, the method comprising:
   receiving a plurality of new data messages at a system including one or more processors and memory, the new data messages containing data for modifying data within a working database of the system, at least one data message of the new data messages configured to indicate a latency tolerance, wherein the new data messages accord to a schema that is configured to selectively indicate to the system the latency tolerance independent of price and volume attributes of the schema;
   the one or more processors adding new data records to the working database based on at least some of the new data messages, including adding at least one new data record for the at least one data message indicating the latency tolerance, the latency tolerance configured to constrain new data records indicating the latency tolerance to remain in the working database for a minimum duration;
   the one or more processors prioritizing the data records present in the working database according to prioritization criteria, the prioritization criteria configured to increase priority of data records indicating the latency tolerance; and
   the one or more processors matching data messages of the plurality of new data messages with the data records present in the working database according to the prioritizing of the data records, and updating data contained in a particular data record upon successful match with a particular new data message.

2. The method of claim 1, wherein updating a data record based on a successful match is performed irrespective of the latency tolerance.

3. The method of claim 1, wherein updating a data record does not remove the latency tolerance.

4. The method of claim 1, wherein updating a data record does not modify any elapsed time under the minimum duration for the data record.

5. The method of claim 1, wherein updating a data record resets elapsed time under the minimum duration for the data record.

6. The method of claim 1, wherein the latency tolerance specifies an amount for the minimum duration.

7. The method of claim 1, wherein the minimum duration is between about 1 millisecond and about 30,000 milliseconds.

8. The method of claim 1, wherein the plurality of new data messages represent a plurality of orders for a financial instrument or interest whose bid and offer orders are represented by the data records in the working database.

9. The method of claim 8, wherein the at least one data message is configured with an attribute to indicate the latency tolerance.

10. The method of claim 8, wherein the prioritization criteria is configured to prioritize data records based on price and thereafter based on affirmative latency tolerance and thereafter based on time.

11. The method of claim 8, wherein the latency tolerance is selectable on an order-by-order basis, as controlled by a market participant.

12. The method of claim 1, further comprising delaying an update to at least one of the new data records indicating the latency tolerance by a calculated duration.

13. The method of claim 12, further comprising randomly or pseudo-randomly calculating the duration.

14. The method of claim 13, wherein the randomly or pseudo-randomly calculated duration is bounded by maximum and minimum bounds.

15. The method of claim 1, wherein the updating comprises deleting the particular data record upon successful match with the particular new data message.

16. A database system comprising:
   a communications interface configured to receive data messages over a network;
   a working database for storing data records based on data contained in data messages;
   an engine configured to add new data records to the working database based on new data messages, including adding at least one new data record for at least one data message indicating a latency tolerance, wherein the new data messages accord to a schema that is configured to selectively indicate to the system the latency tolerance independent of price and volume attributes of the schema, the latency tolerance configured to constrain new data records indicating the latency tolerance to remain in the working database for a minimum duration;
   the engine further configured to prioritize the data records present in the working database according to prioritization criteria, the prioritization criteria configured to increase priority of data records indicating the latency tolerance;
   the engine further configured to match received data messages with the data records present in the working database according to the prioritizing of the data records, and to update data contained in a particular data record upon successful match with a particular new data message.

17. The system of claim 16, wherein the engine is configured to update data record based on a successful match irrespective of the latency tolerance.

18. The system of claim 16, wherein the engine is configured to not remove the latency tolerance when updating a data record.

19. The system of claim 16, wherein the engine is configured to not modify any elapsed time under the minimum duration for an updated data record.

20. The system of claim 16, wherein the engine is configured to reset an elapsed time under the minimum duration for an updated data record.

21. The system of claim 16, wherein the latency tolerance specifies an amount for the minimum duration.

22. The system of claim 16, wherein the minimum duration is between about 1 millisecond and about 30,000 milliseconds.

23. The system of claim 16, wherein the data messages represent orders for a financial instrument or interest whose bid and offer orders are represented by the data records in the working database.

24. The system of claim 23, wherein the at least one data message is configured with an attribute to indicate the latency tolerance.

25. The system of claim 23, wherein the prioritization criteria is configured to prioritize data records based on price and thereafter based on affirmative latency tolerance and thereafter based on time.

26. The system of claim 23, wherein the latency tolerance is selectable on an order-by-order basis, as controlled by a market participant.

27. The system of claim 16, wherein the engine is configured to delay an update to at least one of the new data records indicating the latency tolerance by a calculated duration.

28. The system of claim 27, wherein the engine is configured to randomly or pseudo-randomly calculate the duration.

29. The system of claim 28, wherein the randomly or pseudo-randomly calculated duration is bounded by maximum and minimum bounds.

30. The system of claim 16, wherein the engine is further configured to delete the particular data record upon successful match with the particular new data message.

* * * * *